(12) United States Patent
Tseng

(10) Patent No.: US 7,851,741 B2
(45) Date of Patent: Dec. 14, 2010

(54) HEIGHT ADJUSTMENT DEVICE HAVING A SCREW AXIALLY MOVEABLE RELATIVE TO A ROTARY PLATE ADAPTED IN A PROJECTION APPARATUS AND PROJECTION APPARATUS COMPRISING THE HEIGHT ADJUSTMENT DEVICE

(75) Inventor: Ching Hsi Tseng, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 393 days.

(21) Appl. No.: 12/138,630

(22) Filed: Jun. 13, 2008

(65) Prior Publication Data

US 2009/0032654 A1 Feb. 5, 2009

(30) Foreign Application Priority Data

Aug. 3, 2007 (TW) .............................. 96212786 U

(51) Int. Cl.
*H01J 40/14* (2006.01)
(52) U.S. Cl. ........................................ 250/221; 250/239
(58) Field of Classification Search ................. 250/221, 250/208.1, 548, 559.3, 559.29, 239; 353/70, 353/69, 71, 76, 119; 356/399–401
See application file for complete search history.

(56) References Cited

U.S. PATENT DOCUMENTS 2,429,164 A * 10/1947 Mast et al. ................... 359/826

* cited by examiner

*Primary Examiner*—Que T Le
(74) *Attorney, Agent, or Firm*—Grossman, Tucker, Perreault & Pfleger, PLLC

(57) ABSTRACT

The present invention is related to a height adjustment device adapted in the projection apparatus and projection apparatus comprising the height adjustment device. The projection apparatus has a body and a height adjustment device. The height adjustment device comprises at least one connecting element, a rotary plate, and a screw. The connecting element is connected to the body. The rotary plate meshes with the connecting device for relative rotation, and a threaded hole is formed at the center of the rotary plate. The screw is inserted through the threaded hole to enable the rotary plate to make a linear up-down movement along the axis of the screw when the rotary plate rotates around the screw. Thus, the height adjustment device of the present invention enables a height adjustment without requiring strenuous effort and damaging the projection apparatus.

21 Claims, 7 Drawing Sheets

HEIGHT ADJUSTMENT DEVICE HAVING A SCREW AXIALLY MOVEABLE RELATIVE TO A ROTARY PLATE ADAPTED IN A PROJECTION APPARATUS AND PROJECTION APPARATUS COMPRISING THE HEIGHT ADJUSTMENT DEVICE

This application claims priority to Taiwan Patent Application No. 096212786 filed on Aug. 3, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a height adjustment device adapted for a projection apparatus; and more particularly, it provides a height adjustment device for adjusting a slanting angle of a projected image in a projection apparatus by changing the height of the side of the projection apparatus.

2. Descriptions of the Related Art

With the rapid development of information propagating technologies, projection apparatuses have been used both in home A/V entertainment activities and in meeting presentations of business entities. Meanwhile, the evolvement of associated technologies has made projection apparatuses increasingly lightweight and miniaturized, which further contributes to the increasing popularity of these products.

In practice, a projection apparatus frequently needs to be adjusted in terms of the projection angle thereof according to the concrete surroundings of the user. For example, when a projection apparatus is used within a relatively restricted space or installed at a particular location, it would be difficult to position the projection apparatus as far back as possible to zoom in or to improve the quality of an image. In this case, the user may accomplish this goal by elevating the projection side of the projection apparatus to a certain elevation angle. Similarly, when a support or a platform on which the projection apparatus is installed is not leveled, the lateral tilting angle of the projection apparatus has to be adjusted in such a way that distortion will not occur in the projected image, thus ensuring the quality of the image projected.

FIG. 1 is a perspective view of a projection apparatus 1 of the prior art. The projection apparatus 1 has a height adjustment device 11 and a body 13 which further has a housing 10. The height adjustment device 11 is disposed below the front side of the body 13 and extends partially beyond the housing 10. For further illustration, a perspective view of the height adjustment device 11 is depicted in FIG. 2. The height adjustment device 11 has a clamp spring body 110, a clamp spring controlling element 111 and a screw 112. The clamp spring body 110 is formed with a hole 110a for the screw 112 to insert therethrough. The clamp spring controlling element 111 is connected with the clamp spring body 110 and engaged with a clamp spring (not shown) inside the clamp spring body 110 to fix the screw 112 within the hole 110a indirectly. Accordingly, the height adjustment device 11 adjusts the height in the following way: the clamp spring for clamping the screw 112 in the clamp spring body 110 is released by pressing the clamp spring controlling element 111, and then the projection apparatus 1 is lifted to manually adjust the extended length of the screw 112 to adjust the projection apparatus 1 to an appropriate height. Once the desired height is obtained, the clamp spring controlling element 111 is released and the clamp spring clamps and consequently fixes the screw 112 again.

However, in case the projection apparatus has a large weight, strenuous effort is needed to lift it up. Moreover, when the projection apparatus is lowered down, the potential shock or impact may be caused if the projection apparatus is not handled carefully or the clamp spring is not clamped to the screw securely, thus causing damage to the projection apparatus.

On the other hand, such height adjustment devices 11 are mostly adapted to change the height of the projected image by adjusting an elevation angle and the depression angle of the projection apparatus. However, the installation of a projection apparatus affects not just the height of an image projected. For example, when the projection apparatus is installed on an unleveled floor or a support, an image projected will be out of level, causing the slanting of the image in the left-right direction. Since the requirements on the slanting adjustment amount are lower than those on the height adjustment, only a fine tuning is required on the slanting angle. In this case, the height adjustment device 11 which delivers a substantial adjustment will not apply. For this reason, none of the projection apparatuses currently available are provided with an adjustment device for adjusting the slanting angle of an image.

In view of this, it is highly desirable in the art to provide a novel height adjustment device mainly adapted for the fine adjustment of the slanting angle in the left-right direction without requiring strenuous effort and causing potential damage to the projection apparatus.

SUMMARY OF THE INVENTION

One objective of this invention is to provide a height adjustment device adapted for a projection apparatus, which adjusts the height of at least one side of the projection apparatus in the left-right direction by using a simple height adjustment means. As a result, the height adjustment device can indirectly change the laterally slanting angle of the projection apparatus without requiring strenuous effort and causing potential shock or impact in lifting the apparatus.

This invention discloses a height adjustment device adapted for a projection apparatus. The projection apparatus has a body. The height adjustment device comprises at least one connecting element, a rotary plate, a screw and a stopper. The at least one connecting element is connected to the body. The rotary plate is engaged with the at least one connecting element for the relative rotation with respect to each other, while the rotary plate is provided with a threaded hole at a center thereof. The screw is screwed through the threaded hole to enable the rotary plate to move axially relative to the screw when the rotary plate rotates around the screw.

This invention further discloses a projection apparatus incorporating the aforesaid height adjustment device. The projection apparatus comprises a body and a height adjustment device as defined above. The body has a case. The height adjustment device comprises at least one connecting element, a rotary plate, a screw and a stopper. The at least one connecting element is connected to the body. The rotary plate is engaged with the at least one connecting element for relative rotation with respect to each other. The rotary plate is provided with the threaded hole at the center thereof, through which the screw is screwed. When the rotary plate is rotated around the screw to move linearly, it is adapted to drive the body to make a linear movement synchronously relative to the screw.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
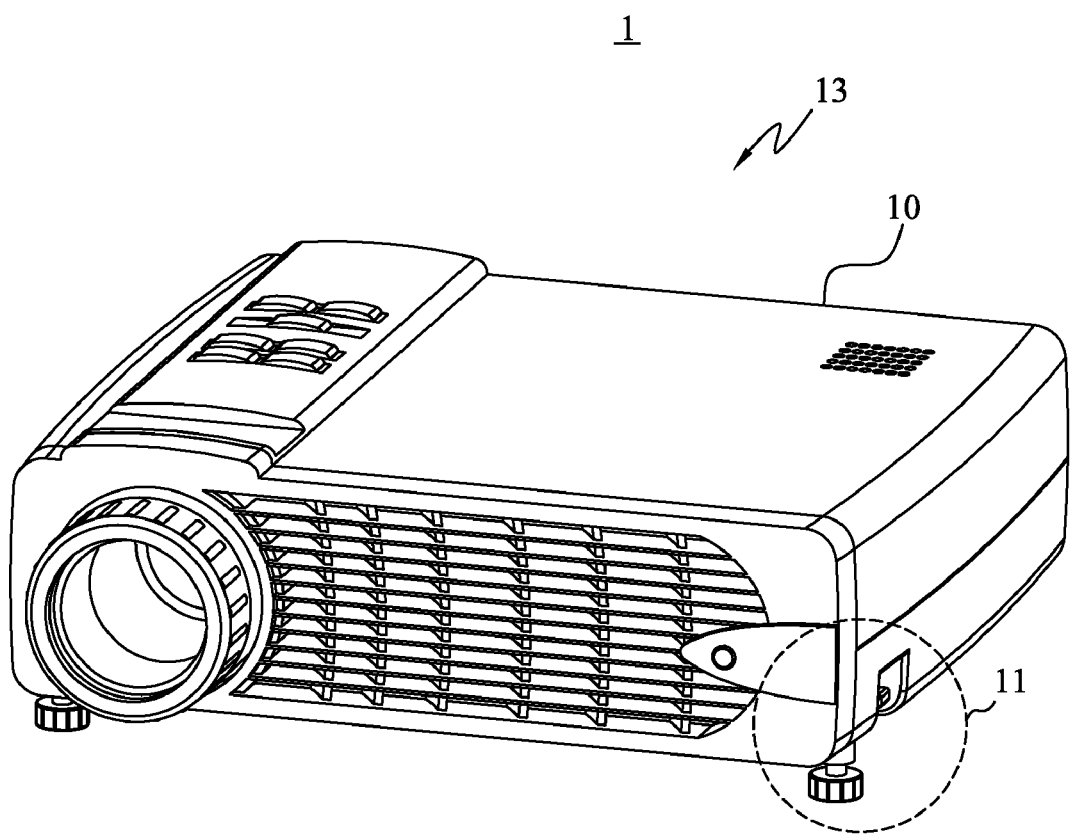
FIG. 1 is a perspective view of a projection apparatus of the prior art.
Figure 2:
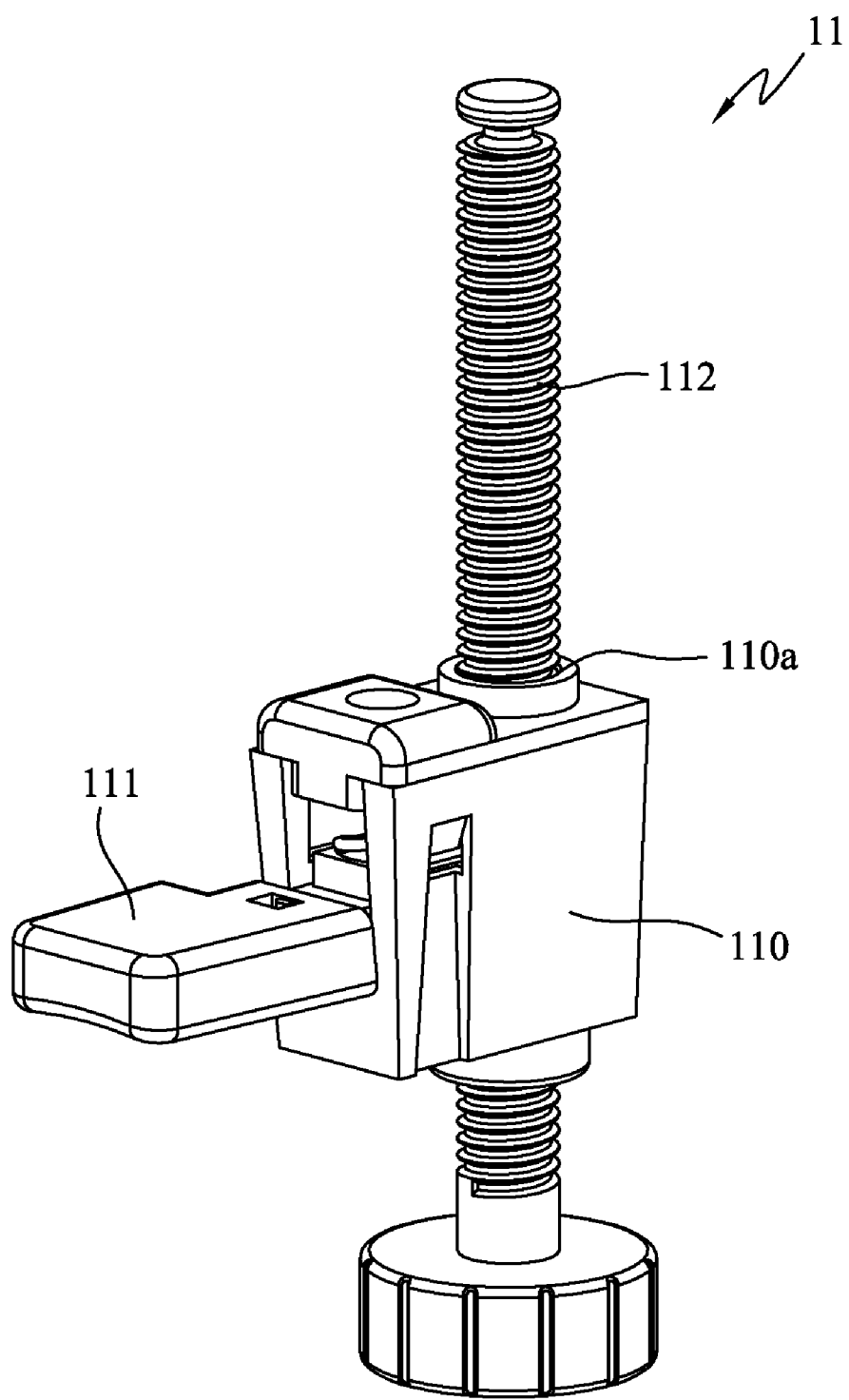
FIG. 2 is a perspective view of a height adjustment device of FIG. 1.
Figure 3A:
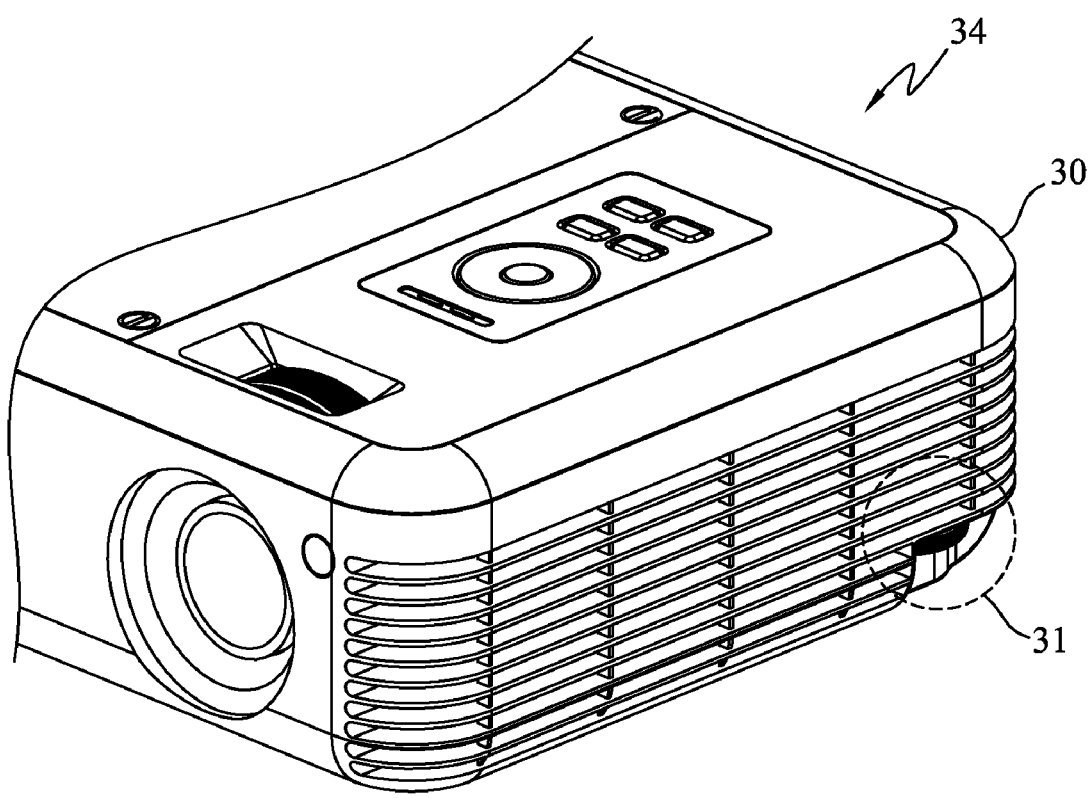
FIG. 3A and FIG. 3B are perspective views of this invention at two different perspective angles.
Figure 4A:
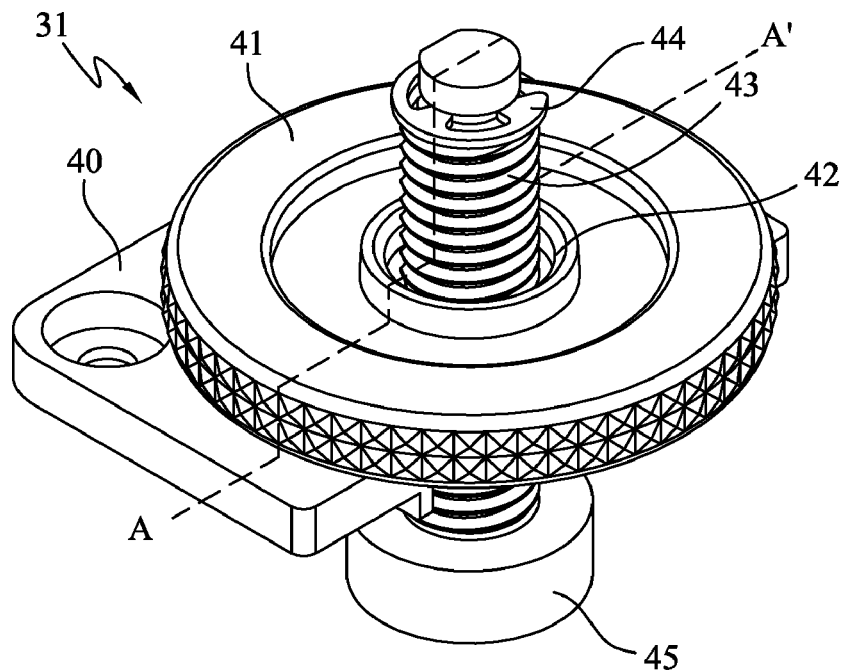
FIG. 4A is a perspective view of the height adjustment device in accordance with the first embodiment of this invention.

The first embodiment of this invention is a projection apparatus 3, a perspective view of which is shown in FIG. 3A. The projection apparatus 3 has a body 34 and a height adjustment device 31. The body 34 has a case 30. The height adjustment device 31 is disposed on the rear left side of the body 34 with respect to an image projecting end. In other embodiments, the height adjustment device 31 may also be disposed at any location on the left and/or right side of the projection apparatus 3. FIG. 4A depicts a perspective view of the height adjustment device 31, which comprises a connecting element 40, a rotary plate 41, a screw 43, a stopper 44 and a buffer cushion 45.

Figure 4B:
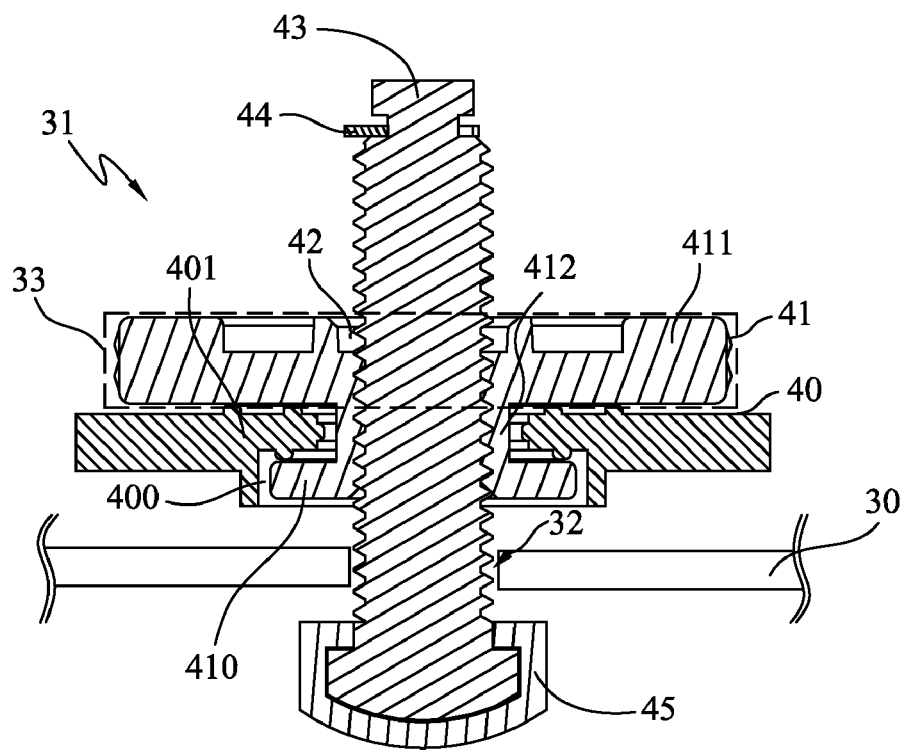
FIG. 4B is a cross-sectional view of the height adjustment device of FIG. 4A taken along line A-A'.

The connecting element 40 is connected to and formed integrally with the body 34. As shown in FIG. 4B, a cross-sectional view of the height adjustment device 31 of FIG. 4A taken along line A-A' is depicted therein. The rotary plate 41 has a protrusion portion 410, an annular body 411 and an annular neck portion 412. The protrusion portion 410 is formed under the annular body 411 and cooperates with the annular body 411 to define the annular neck portion 412. On the other hand, the connecting element 40 has a recess portion 400 and an annular shoulder portion 401 which defines the recess portion 400. The recess portion 400 has a shape corresponding to that of the protrusion portion 410. When the rotary plate 41 and the connecting element 40 are movably engaged to accomplish a rotation relative to each other, the protrusion portion 410 of the rotary plate 41 is engaged in the recess portion 400 of the connecting element 40 and the annular shoulder portion 401 is engaged in the annular neck portion 412 to render the connecting element 40 and the rotary plate 41 inseparable along the axis. In this way, the connecting element 40 and the rotary plate 41 are engaged with and rotated relative to each other.

Disposed at the center of the rotary plate 41 is a threaded hole 42, into which the screw 43 is screwed. When rotated around the screw 43, the rotary plate 41 moves linearly along the axis of the screw 43. Because the rotary plate 41 is engaged with the connecting element 40, the axial movement of the rotary plate 41 along the screw 43 will force the connecting element 40 to move together. As previously described, the connecting element 40 is connected with the body 34 of the projection apparatus 3, so with the linear movement caused by rotating the rotary plate 41, the body 34 is elevated by a certain height. Consequently, the horizontal angle, and thereby the slanting angle in the left-right direction, of the image projected by the projection apparatus 3 can be adjusted.

To prevent the rotary plate 41 from rotating out of the screw 43 when moving toward the upper side of the screw 43, the stopper 44 is disposed in the upper region of the screw 43 in this embodiment to stop the rotary plate 41. In this embodiment, the stopper 44 is a C-shaped clamp spring. However, other kinds of stoppers readily occurring to those skilled in the art may be used in other embodiments. Additionally, the buffer cushion 45, which is made of an elastic material (e.g., a rubber material), is disposed at the bottom of the screw 43. This may increase the friction force against the torque of the rotating rotary plate 41 and provide enhanced buffering and support when the projection apparatus 3 is handled to provide better protection and support for the projection apparatus 3 as a whole.

Figure 3B:
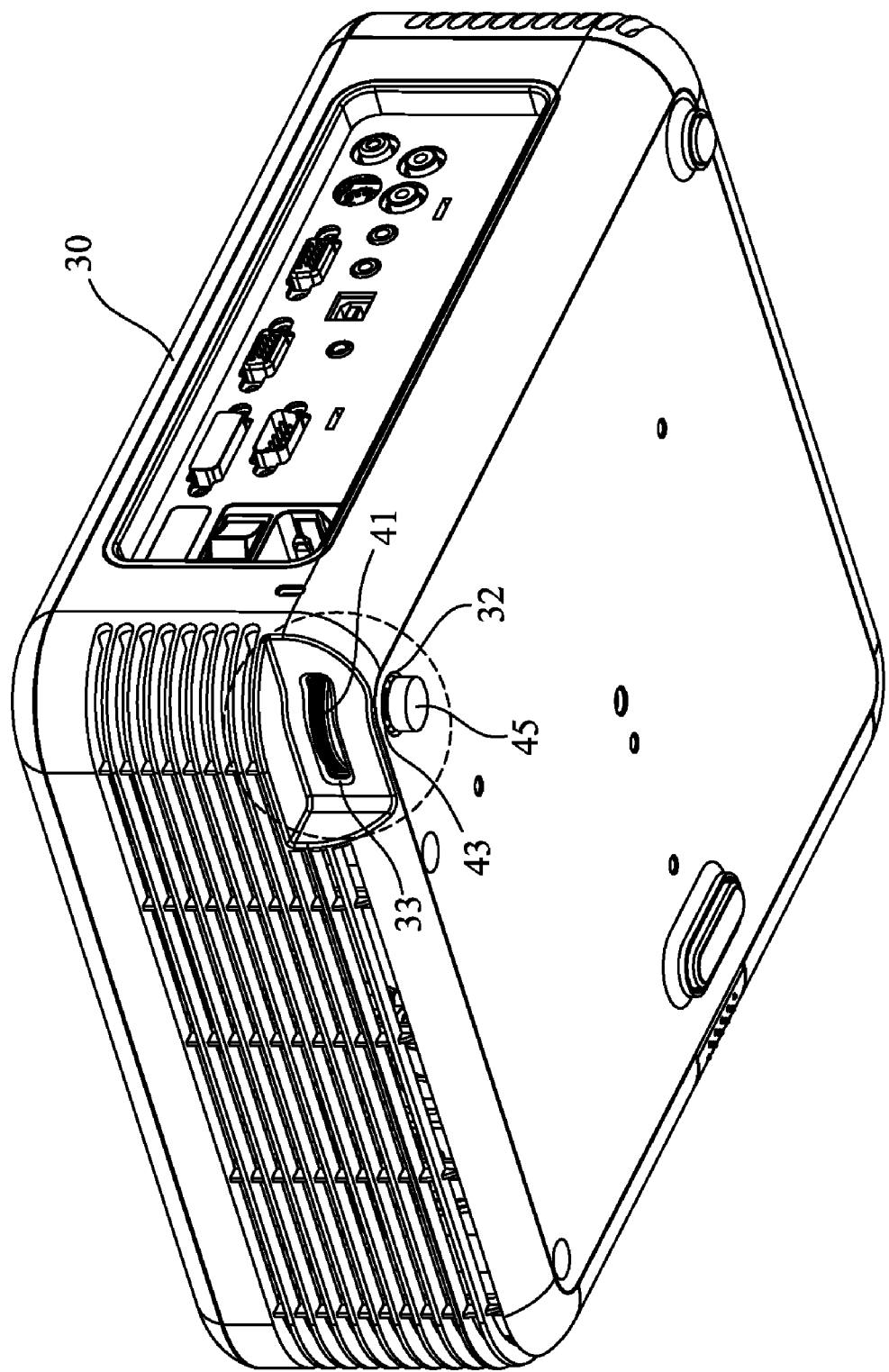
Figure 3C:
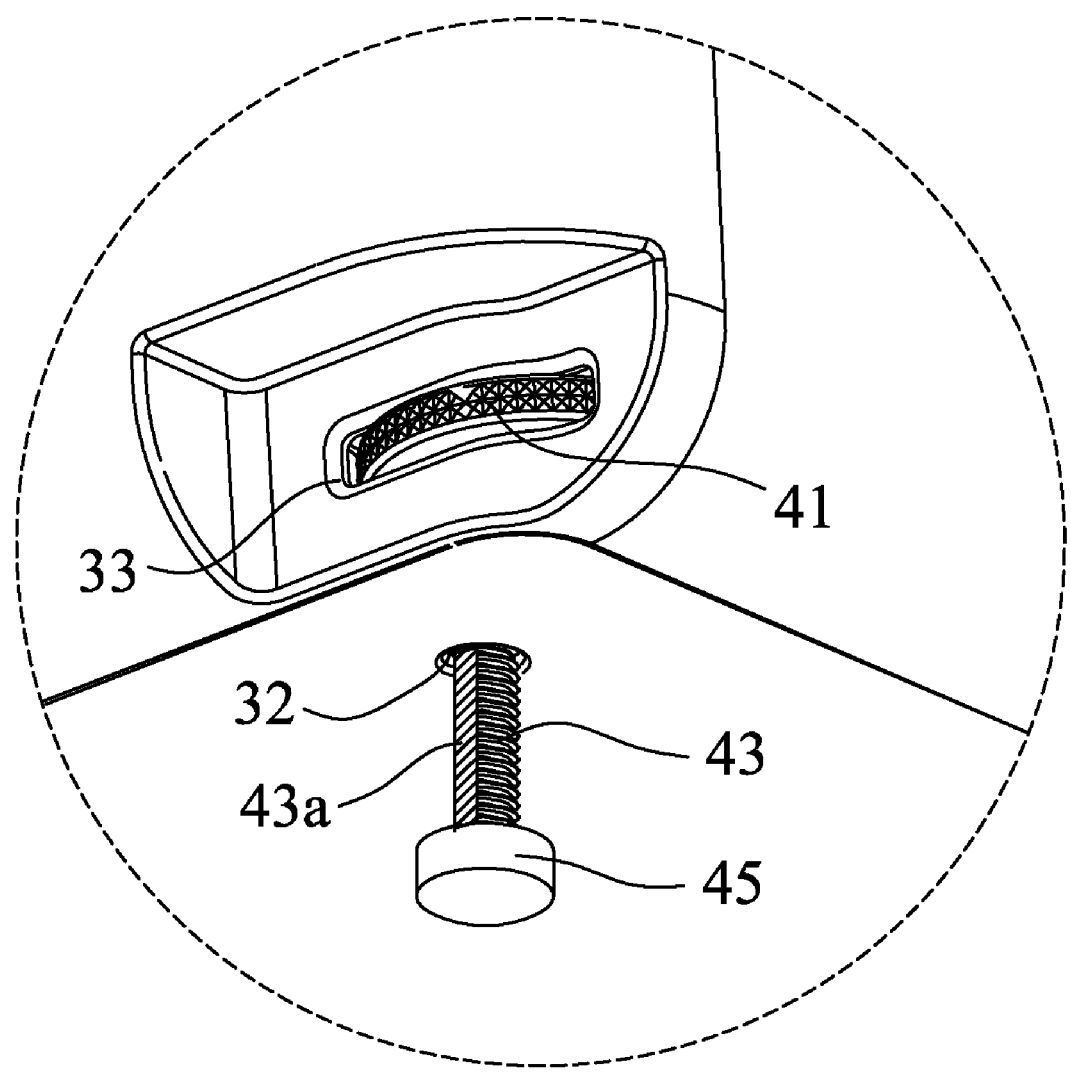
FIG. 3C is an enlarged view of a circled portion in FIG. 3B.

FIG. 3B is a perspective view of the projection apparatus 3 at a different perspective angle. The case 30 of the projection apparatus 3 has a hole 32 and an opening 33, an enlarged view of which is shown in FIG. 3C. The hole 32 is disposed at the bottom of the case 30 for the screw 43 to insert therethrough. The lower end of the screw 43 protrudes out of the case 30 and comes into contact with the floor or the support with the buffer cushion 45 thereof. The lower end of the screw 43 has a non-circular cross-section 43a, while the hole 32 has a shape complementary with the non-circular cross-section 43a. As shown in FIG. 3C, in this embodiment, the non-circular cross-section 43a is formed by cutting an original circular cross-section along the chord other than the diameter. By inserting the screw 43 with a non-circular cross-section 43a into the complementary non-circular hole 32, the screw 43 is restricted from rotating in company with the rotary plate 41. Furthermore, the opening 33 is formed on the sidewall of the case 30, and is adapted to expose a portion of the rotary plate 41 out of the case 30 to facilitate adjustment by the user. Positions of the hole 32, the case 30, the opening 33 and the rotary plate 41 relative to each other are illustrated more clearly in FIG. 4B.

Figure 5A:
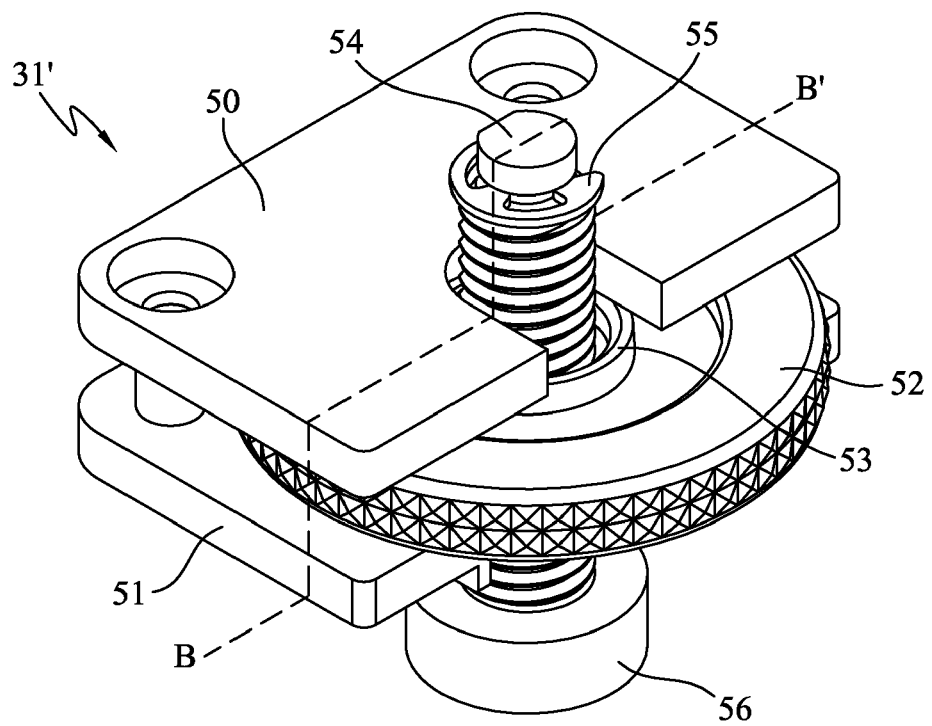
FIG. 5A is a perspective view of a height adjustment device in accordance with the second embodiment of this invention.
Figure 5B:
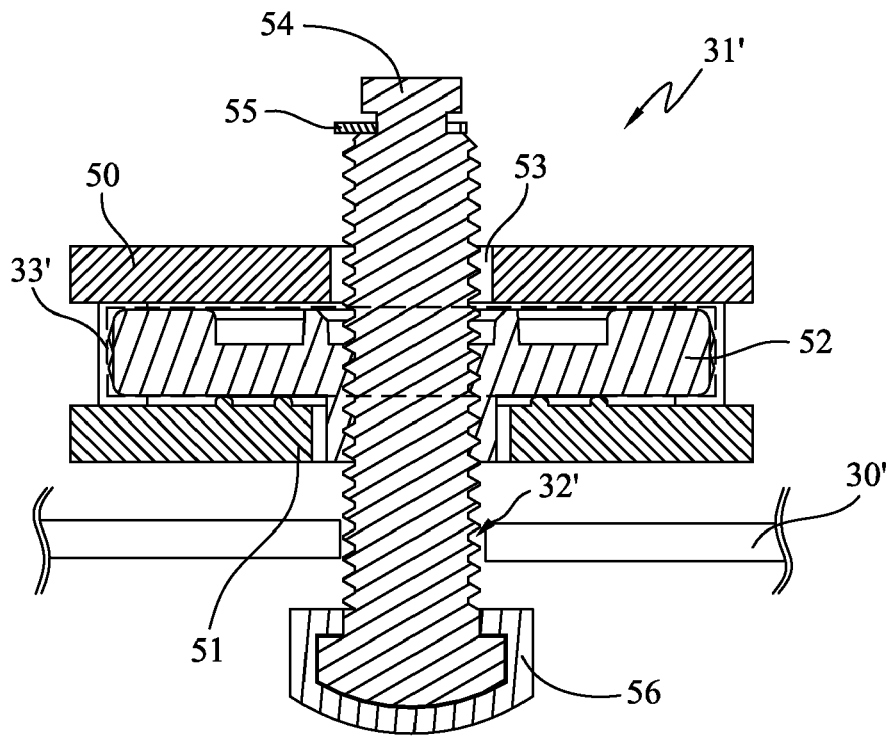
FIG. 5B is a cross-sectional view of the height adjustment device of FIG. 5A taken along line B-B'.

The second embodiment of this invention is also a projection apparatus with a height adjustment device. Unlike previous embodiments, the connecting element and the rotary plate in the height adjustment device of this embodiment are engaged with each other in a different configuration. Hence, only the height adjustment device will be particularly described herein. FIG. 5A is a perspective view of the height adjustment device 31' in accordance with the second embodiment of this invention, while FIG. 5B is a cross-sectional view of the height adjustment device 31' of FIG. 5A taken along line B-B'. As shown in both FIGS. 5A and 5B, the height adjustment device 31' comprises a pair of connecting elements connected with each other, a rotary plate 52, a screw 54, a stopper 55 and a buffer cushion 56.

The pair of connecting elements connected with each other are a first connecting element 50 and a second connecting element 51 disposed above and below the rotary plate 52 respectively. Both the first connecting element 50 and the second connecting element 51 are connected to and formed integrally with the body (not shown) of the projection apparatus. As can be seen from FIG. 5B, the rotary plate 52 are movably engaged with the first connecting element 50 and the second connecting element 51 in a relative rotation manner. The rotary plate 52 is formed with a threaded hole 53 at the center thereof, into which the screw 54 is screwed. When being rotated around the screw 54, the rotary plate 52 is adapted to move linearly along the axis of the screw 54. As in the previous embodiment, the rotary plate 52 is partially exposed out of the case 30' through an opening 33', while the screw 54 is inserted through a non-circular hole 32'.

To prevent the rotary plate 52 from rotating out of the screw 54, a stopper 55 is also disposed in the upper region of the screw 54 in this embodiment to stop the rotary plate 52. In this embodiment, the stopper 55 is a C-shaped clamp spring. However, other kinds of stoppers readily occurring to those skilled in the art may be used in other embodiments. Additionally, a buffer cushion 56, which is made of an elastic material (e.g., a rubber material), is disposed at the bottom of the screw 54. This may increase the friction force against the torque of rotating the rotary plate 52 and provide enhanced buffering and support when the projection apparatus is handled to provide better protection and support for the projection apparatus as a whole.

It should be emphasized that the manner in which the rotary plate and the connecting element are engaged with each other is not merely limited to what described above, and other embodiments in this aspect may readily occur to those skilled in the art. Similarly, in other embodiments, the number and locations of the height adjustment devices are not merely limited to what is described above, while the height adjustment device may also be used to replace devices for adjusting an elevation angle and a depression angle in solutions of the prior art.

It follows from the above description that with the height adjustment device of this invention, the height of a screw is adjusted by rotating a rotary plate, and then through the engagement between the rotary plate and the connecting element, the elevated height at the side of the projection apparatus is changed. As a result, no strenuous effort is needed to lift the project apparatus or to prevent potential shock or impact to the projection apparatus. In addition, the slanting angle of the projected images in the horizontal direction can be fine tuned.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A height adjustment device adapted for a projection apparatus, the projection apparatus having a body, the height adjustment device comprising:
    at least one connecting element, connected to the body;
    a rotary plate, engaged with the at least one connecting element to perform a relative rotation with respect to the at least one connecting element, and the rotary plate being provided with a threaded hole formed at a center of the rotary plate; and
    a screw, screwed through the threaded hole to enable the screw to move axially relative to the rotary plate when the rotary plate rotates around the screw.

2. The height adjustment device as claimed in claim 1, wherein the at least one connecting element comprises a connecting element, one of the connecting element and the rotary plate has a protrusion portion, the other has a recess portion corresponding to the protrusion portion, and the protrusion portion engages in the recess portion such that the connecting element and the rotary plate are inseparable along the axis.

3. The height adjustment device as claimed in claim 2, wherein the rotary plate has an annular body, the protrusion portion is formed under the annular body and cooperates with the annular body to define an annular neck portion, the connecting element has an annular shoulder portion for defining the recess portion, and the annular shoulder portion is engaged in the annular neck portion when the rotary plate engages with the connecting element to perform a relative rotation with respect to the connecting element.

4. The height adjustment device as claimed in claim 1, wherein the at least one connecting element comprises a pair of the connecting elements, disposed above and below the rotary plate, respectively.

5. The height adjustment device as claimed in claim 4, wherein the pair of the connecting elements connect with each other.

6. The height adjustment device as claimed in claim 1, further comprising a stop element being disposed at an upper region of the screw and adapted for preventing the rotary plate from rotating out of the screw.

7. The height adjustment device as claimed in claim 1, wherein a buffer cushion is disposed at a bottom of the screw.

8. The height adjustment device as claimed in claim 7, wherein the buffer cushion is made of an elastic material.

9. The height adjustment device as claimed in claim 1, wherein the at least one connecting element is integrated with the body.

10. A projection apparatus, comprising:
    a body, having a case, and
    a height adjustment device as claimed in claim 1, wherein the at least one connecting element is connected to the case, and the rotary plate rotates along the axis of the screw to move axially for driving the body to move axially synchronously relative to the screw.

11. The projection apparatus as claimed in claim 10, wherein the at least one connecting element comprises a connecting element, one of the connecting element and the rotary plate has a protrusion portion, the other has a recess portion corresponding to the protrusion portion, and the protrusion portion engages in the recess portion such that the connecting element and the rotary plate are inseparable along the axis.

12. The projection apparatus as claimed in claim 11, wherein the rotary plate has an annular body, the protrusion portion is formed under the annular body and cooperates with the annular body to define an annular neck portion, the connecting element has an annular shoulder portion for defining the recess portion, and the annular shoulder portion is engaged in the annular neck portion when the rotary plate engages with the connecting element to perform a relative rotation with respect to the connecting element.

13. The projection apparatus as claimed in claim 10, wherein the at least one connecting element comprises a pair of connecting elements, disposed above and below the rotary plate, respectively.

14. The projection apparatus as claimed in claim 13, wherein the pair of connecting elements connect with each other.

15. The projection apparatus as claimed in claim 10, wherein the height adjustment device further comprises a stop element being disposed at an upper region of the screw and adapted for preventing the rotary plate from rotating out of the screw.

16. The projection apparatus as claimed in claim 10, wherein the screw is further provided with a buffer cushion, disposed at a bottom of the screw.

17. The projection apparatus as claimed in claim 16, wherein the buffer cushion is made of an elastic material.

18. The projection apparatus as claimed in claim 10, wherein the case further has:

a hole being formed at a bottom of the case, wherein the screw inserts through the hole, and a bottom of the screw protrudes out of the case.

19. The projection apparatus as claimed in claim 10, wherein the case further has:

an opening, being formed at a lateral wall of the case and adapted for exposing a part of the rotary plate out of the case.

20. The projection apparatus as claimed in claim 10, wherein a bottom of the screw has a clamping mechanism for clamping the rotary plate not to rotate when the rotary plate rotates.

21. The projection apparatus as claimed in claim 20, wherein the clamping mechanism comprises a non-circular cross section, and the hole has a complementary shape with the non-circular cross section.

* * * * *